Patented Sept. 12, 1944

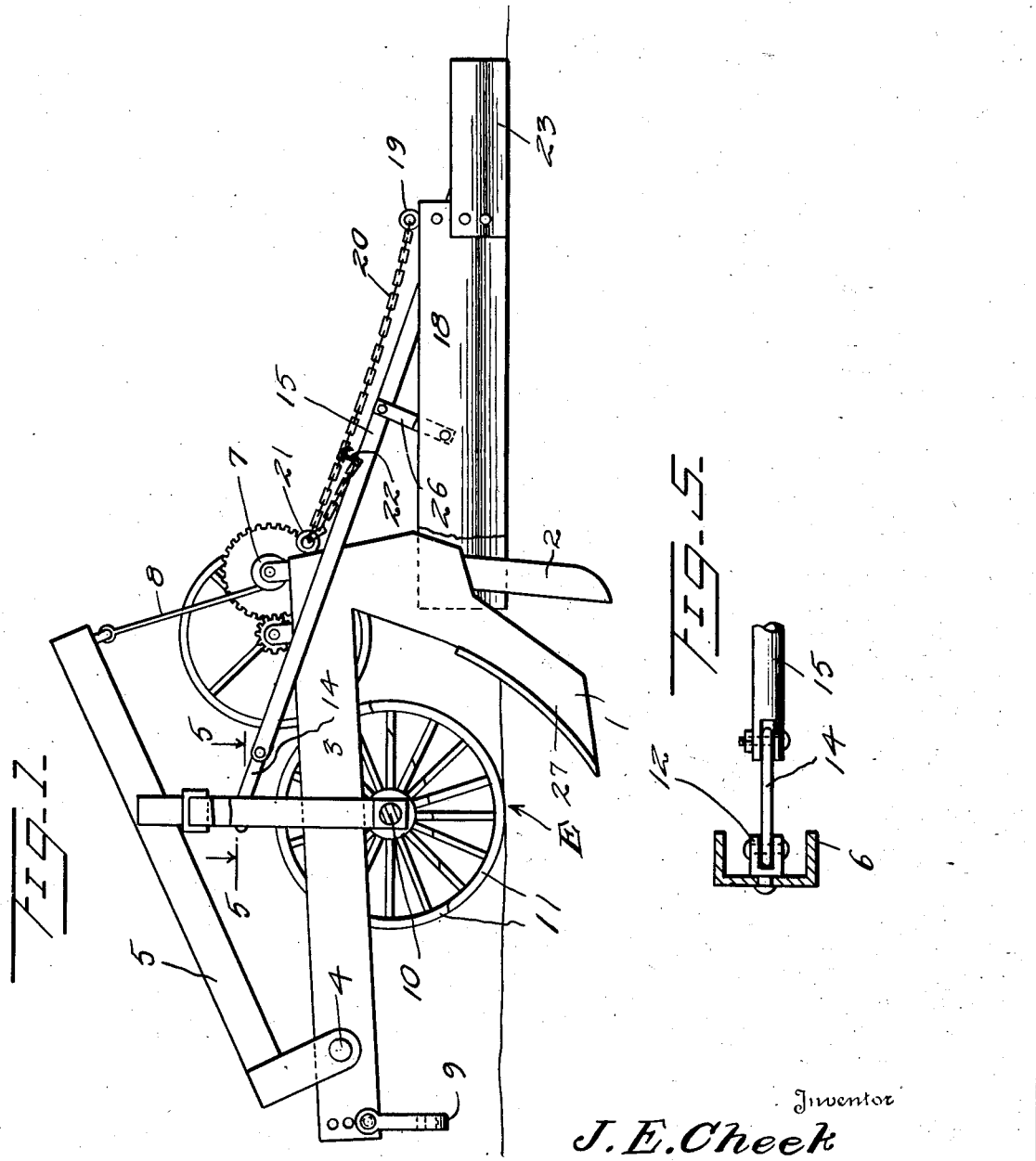

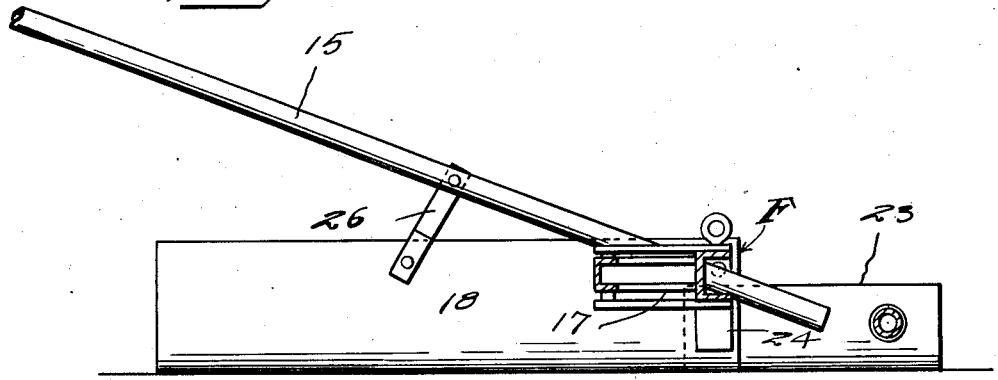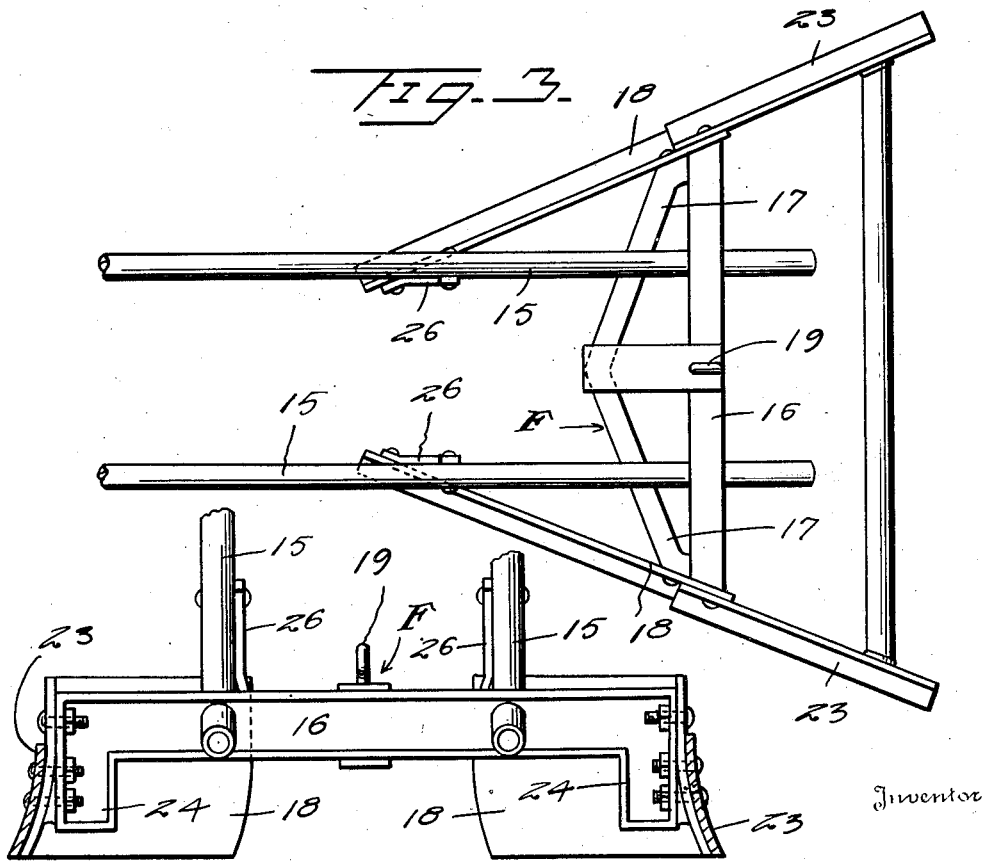

2,357,999

UNITED STATES PATENT OFFICE 2,357,999

FLOATING WING FOR EXCAVATING IMPLEMENTS

John E. Cheek, Pampa, Tex.

Application July 13, 1943, Serial No. 494,495

3 Claims. (Cl. 37—98)

This invention relates to a floating wing for an excavating implement and has relation more particularly to a wing for use in connection with an implement used in the oil fields in taking up pipe lines.

It is a particular object of the invention to provide a wing which can be readily applied to or mounted upon an implement in a manner permitting variation in depth of plowing without alteration of the wing position.

It is also an object of the invention to provide a floating wing which, when in applied position, is free to move to ride upon the top of the ground surface to provide means to push the dirt raised by the implement away from the ditch.

The invention consists in the details of construction and in the combination and arrangement of the several parts of my improved floating wing for an excavating implement whereby certain important advantages are attained, as will be hereinafter more fully set forth.

In order that my invention may be better understood, I will now proceed to describe the same with reference to the accompanying drawings, wherein:

Figure 1 is a view in side elevation of a floating wing constructed in accordance with an embodiment of the invention and in applied position.

Figure 2 is an enlarged view partly in section and partly in elevation of the floating wing as herein comprised.

Figure 3 is a view in top plan of the floating wing with portions broken away.

Figure 4 is a view in rear elevation of the floating wing with parts in section, and Figure 5 is an enlarged fragmentary sectional view taken substantially on the line 5—5 of Figure 1.

As disclosed in the accompanying drawings, E denotes an excavating implement of a type which is used in the oil fields in digging up pipe lines and which implement includes the plow 1 followed by the depending member 2 which, in practice, provides means to break the pipes loose. This plow 1 depends from the rear end portion of a beam 3, the forward end portion of which is connected, as at 4, to the forward extremity of an elongated bolster 5.

Secured to and depending from the opposite sides of this bolster 5 substantially midway the length thereof are the substantially vertically disposed beams 6 between which the plow beam 3 freely passes. The rear portion of this beam 3 carries a winch 7 upon which winds or unwinds a flexible member 8 suitably anchored to the adjacent rear end portion of the bolster 5 to provide means whereby the beam 3, together with the plow 1 and the member 2, may be raised as desired or allowed to drop.

The forward extremity of the plow beam 2 has associated therewith a suitable hitch 9 while the lower end portions of the vertically disposed beams 6 carry the axle or shaft 10 on the extremities of which are mounted the ground-engaging wheels 11. The plow 1 is positioned rearwardly of the axle or shaft 10 and the ground-engaging wheels 11 are arranged at a material distance outwardly of the beams 6. The particular construction of the implement E, as herein disclosed, in itself forms no part of the present invention as it is of a type now well known in the oil fields.

The beams 6 in their upper portions and at points herein disclosed as closely adjacent to the under surface of the beam 3 are each provided with the rearwardly disposed lug 12 with which is pivotally engaged a link 14 also pivotally connected to the forward extremity of one of the upwardly inclined parallel elongated members 15. The rear or lower end portions of these members 15 extend through and are rigidly secured to the rear transverse member 16 of a substantially Vs shaped frame F, the apex portion of which is forwardly disposed.

To the forwardly converging side members 17 of the frame F are secured the mold boards 18 of desired dimensions and which have their forward converging extremities spaced apart a material distance or a mean distance approximating the width of the ditch being dug by the plow 1. These mold boards 18 are preferably arranged on an angle of about 30 degrees and are rigidly maintained in desired assembly by the interposed frame F to which said mold boards are attached.

When the floating wing structure is applied, the mold boards 18 freely ride on the ground surface to the rear of but closely adjacent to the plow 1 and extend outwardly and rearwardly from the line of travel, so that as the implement advances, the dirt raised up by the plow 1 will be pushed away from the ditch to prevent the dirt falling back onto the pipe line before it can be raised.

The central portion of the rear member 16 of the frame F is provided with an upstanding eye member 19 to which is secured the lower extremity of a flexible member 20, herein disclosed as a chain. This member or chain 19 threads through an outstanding eye member 21 carried by the rear end of the beam 3 and said member or chain 20 at its outer extremity is herein disclosed as carrying a hook member 22 which may be readily selectively engaged with the member or chain 20, whereby effective means is provided to support the rear portion of the floating wing attachment and more particularly when said wing attachment is to be maintained in a raised position when the implement is not in use or is being transported from one location or operation to another.

When the plow 1 is being used for deep digging or excavating, it is advisable to employ the rear additional or supplemental mold boards 23. These mold boards 23 do not have to be of the same width as the forward or permanent mold boards 18 as the width of such boards is of no particular importance. However, the lower edges of these mold boards 23 should be substantially coplanar with the lower margins of the boards 18. These mold boards 23 are disposed on forward convergence on a desired angle and the forward extremities thereof are detachably connected in any desired manner with the short depending arms 24 at the sides of the frame F at the rear thereof, and the rear or outer extremities of these supplemental mold boards 23 are connected by the interposed bracing and reinforcing member 25.

It is believed to be obvious from the foregoing that in practice the mounting of the floating wing attachment allows variation in depth of digging or excavating of the plow 1 without requiring alteration or adjusment of the position of the wings or mold boards 18.

Interposed between the forward extremities of the side members 17 of the frame F and the elongated members 15 are the bracing or reinforcing members 26.

The boards 18 are each of such length, as is illustrated in Figure 1, to terminate behind but closely adjacent to the plow point 27 to effectively prevent the dirt raised by the plow from falling back into the ditch.

From the foregoing description it is throught to be obvious that a floating wing for an excavating implement constructed in accordance with my invention is particularly well adapted for use by reason of the convenience and facility with which it may be assembled and operated.

What is claimed is:

1. An attachment for a ditching machine including a frame and a plow carried thereby, comprising a horizontally disposed frame having converging sides, a pair of mold boards each secured to one of said sides of the second mentioned frame, said mold boards being maintained by the said convergent sides of the second mentioned frame in forwardly converging relation, the convergent ends of the mold boards being spaced apart a distance substantially equal to the width of the plow, a pair of draft beams secured to the second mentioned frame between the mold boards and extending forwardly and upwardly, and means for pivotally coupling the said beams at their upper ends to the ditching plow frame in a position where the forward ends of the mold boards are at the sides of the plow and immediately to the rear thereof.

2. An attachment for a ditching plow having a main frame and a plow member carried thereby, comprising a horizontal frame having a horizontal substantially V shaped forward portion and a rear portion in the form of a transverse beam, said horizontal frame having forwardly converging sides, a pair of mold boards each secured to a side of the horizontal frame and maintained thereby in forwardly convergent relation with the opposite mold board, a pair of draft beams each extending through and secured to the transverse beam of the horizontal frame and extending forwardly and upwardly across the top of the V portion of said horizontal frame at a forward and upward inclination, said draft beams being designed for connection with the first frame, means for establishing a horizontal pivot between each draft beam and the first frame whereby the attachment may have vertical movement relative to the first frame.

3. A ditching plow attachment as set forth in claim 2, in which the transverse beam of the horizontal frame has downwardly extending end portions forming arms to which said mold boards are secured, and coupling links between the mold boards and the draft beams, forwardly of the horizontal frame.

JOHN E. CHEEK.